No. 667,467. Patented Feb. 5, 1901.
G. M. SHERMAN.
DEVICE FOR FERTILIZING PLANTS.
(Application filed May 31, 1900.)
(No Model.)
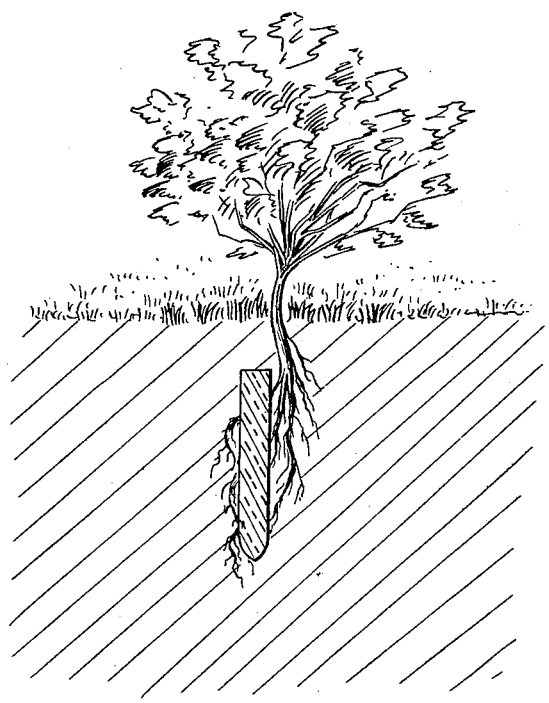
WITNESSES: INVENTOR
Ethel Maude Knight. Gardner M. Sherman,
BY
A. W. Smith.
ATTORNEY.

UNITED STATES PATENT OFFICE.

GARDNER M. SHERMAN, OF SPRINGFIELD, MASSACHUSETTS.

DEVICE FOR FERTILIZING PLANTS.

SPECIFICATION forming part of Letters Patent No. 667,467, dated February 5, 1901.

Application filed May 31, 1900. Serial No. 18,651. (No model.)

*To all whom it may concern:*

Be it known that I, GARDNER M. SHERMAN, a citizen of the United States of America, and a resident of Springfield, in the county of Hampden and State of Massachusetts, have invented certain new and useful Improvements in Devices for Fertilizing Plants, of which the following is a full, clear, and exact description.

My invention relates to an improvement in fertilizer-plugs; and its object is to provide a fertilizing compound which can be forced into the ground beside the plant or tree to be fertilized and from which plug the roots of the plant or tree will extract their nourishment.

My invention consists in a fertilizer-plug formed of plaster-of-paris and Portland cement, which are molded into any suitable shape, and which plug has incorporated in it or is saturated with any suitable fertilizing material, as will be more fully described hereinafter.

Heretofore it has been customary to either scatter the fertilizer over the ground or to place a suitable quantity upon the surface near each plant or tree; but this is both wasteful and unsatisfactory in results. In order to overcome these disadvantages, I propose to place a plug in the ground, so that it will extend down where the roots of the plant or tree can readily twine around it and extract their nourishment.

The accompanying drawing represents a plug embodying my invention in vertical section.

The plug is preferably made cylindrical in shape and sharpened at its lower end, so that it can be readily forced into the ground beside the plant or tree which is to be fertilized. This plug is preferably formed of two parts plaster-of-paris and one part of Portland cement, which are moistened and thoroughly mixed together, and into this compound is intimately mixed any desired amount or kind of fertilizer, either by mixing the fertilizer direct or by making a solution and then saturating the plug.

I do not restrict my invention to any particular proportions or materials, for these may be varied without departing from my invention. The plaster-of-paris not only furnishes lime, but prevents the cement from hardening to too great a degree and at the same time makes the plug absorbent of any fertilizing solution that it may be desired to use. The particular kind of fertilizer will be varied according to the plant or tree that is to be nourished. This plug is forced into the earth any desired distance beside the plant or tree, and then the roots of the plant or tree twine themselves around the plug and extract from it both the lime and the fertilizer embodied in the plug in any suitable form. I have found this to be infinitely preferable to scattering the fertilizer upon the ground or placing a small amount in each hill, for the fertilizer becomes dissolved and leaches away beyond the reach of the roots, whereas if the fertilizer is embodied in a plug, such as is here shown, it is where the roots of the tree or plant can twine around it and extract their nourishment at all times.

A liquid solution of muriate of potash, ammonia, and phosphoric acid is a desirable one for orange-trees and other trees and shrubs, and for flowers, vegetables, and smaller plants a liquid solution of nitrogen, phosphoric acid, potash, and sulfate of potash is a desirable one with which to saturate the plug before inserting the same into the ground.

Having thus described my invention, I claim—

1. A fertilizing-plug containing a fertilizing compound in any suitable form, and pointed at one end so as to be forced into the ground beside the tree or plant to be nourished, substantially as set forth.

2. A plug composed of plaster-of-paris, cement, and a fertilizing material in any suitable form, substantially as specified.

3. A plug composed of plaster-of-paris, cement, and a fertilizing material in any suitable form, which is pointed at one end, substantially as set forth.

Signed by me at Springfield, Massachusetts, in presence of two subscribing witnesses.

GARDNER M. SHERMAN.

Witnesses:
WM. S. BELLOWS,
ETHEL M. KNIGHT.